(12) United States Patent
Nakamura et al.

(10) Patent No.: US 10,344,627 B2
(45) Date of Patent: Jul. 9, 2019

(54) HEAT RECOVERY STEAM GENERATOR AND POWER PLANT

(71) Applicant: KABUSHIKI KAISHA TOSHIBA, Minato-ku (JP)

(72) Inventors: Keiichi Nakamura, Yokohama (JP); Hideaki Shimada, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/873,650

(22) Filed: Jan. 17, 2018

(65) Prior Publication Data

US 2018/0142580 A1    May 24, 2018

Related U.S. Application Data

(62) Division of application No. 14/007,141, filed as application No. PCT/JP2012/057784 on Mar. 26, 2012.

(30) Foreign Application Priority Data

Mar. 25, 2011    (JP) .................. 2011-067530

(51) Int. Cl.
*F22B 1/18* (2006.01)
*F22G 1/16* (2006.01)
(Continued)

(52) U.S. Cl.
CPC .......... *F01K 23/105* (2013.01); *F01K 13/006* (2013.01); *F22B 1/1815* (2013.01); *F22G 1/16* (2013.01); *Y02E 20/16* (2013.01)

(58) Field of Classification Search
CPC ........ F01K 23/105; F01K 13/006; F22G 1/16; F22B 1/1815
See application file for complete search history.

(56) References Cited

U.S. PATENT DOCUMENTS 5,349,812 A    9/1994    Taniguchi
6,092,362 A *  7/2000    Nagafuchi ............... F02C 9/34
                                                 60/39.281
(Continued)

FOREIGN PATENT DOCUMENTS

JP    01-318802 A    12/1989
JP    2001-108202 A    4/2001
(Continued)

OTHER PUBLICATIONS

International Search Report dated May 1, 2012 in PCT/JP2012/057784.

(Continued)

*Primary Examiner* — Jacob J Cigna
*Assistant Examiner* — Lee A Holly
(74) *Attorney, Agent, or Firm* — Oblon, McClelland, Maier & Neustadt, L.L.P.

(57) ABSTRACT

According to the embodiment of the present invention, there are provided a first stage auxiliary burner configured to heat up the exhaust gas in the upstream side of the superheater, a second stage auxiliary burner configured to heat up the exhaust gas in the upstream side of the evaporator, a fuel supply system configured to distribute fuel so as to be supplied to the first stage auxiliary burner and the second stage auxiliary burner. Distribution of fuel charged to each of the first stage auxiliary burner and the second stage auxiliary burner is controlled in accordance with a predetermined distribution ratio of each charging quantity to whole charging quantity in all the range thereof.

2 Claims, 2 Drawing Sheets

(51) Int. Cl.
*F01K 23/10* (2006.01)
*F01K 13/00* (2006.01)

(56) References Cited

U.S. PATENT DOCUMENTS 6,092,363 A  7/2000 Ryan
6,141,956 A * 11/2000 Iijima .................. F22B 1/1815
  122/7 R

FOREIGN PATENT DOCUMENTS

JP   2001-116208 A   4/2001
JP   2004-068652 A   3/2004
WO   WO 2008/107916 A1   9/2008

OTHER PUBLICATIONS

Office Action dated Jun. 21, 2016 in German Patent Application No. 11 2012 001 451.0 (w/ English translation).
Korean Office Action dated Aug. 19, 2014, in Korea Patent Application No. 10-2013-7027752 (with English translation).

* cited by examiner

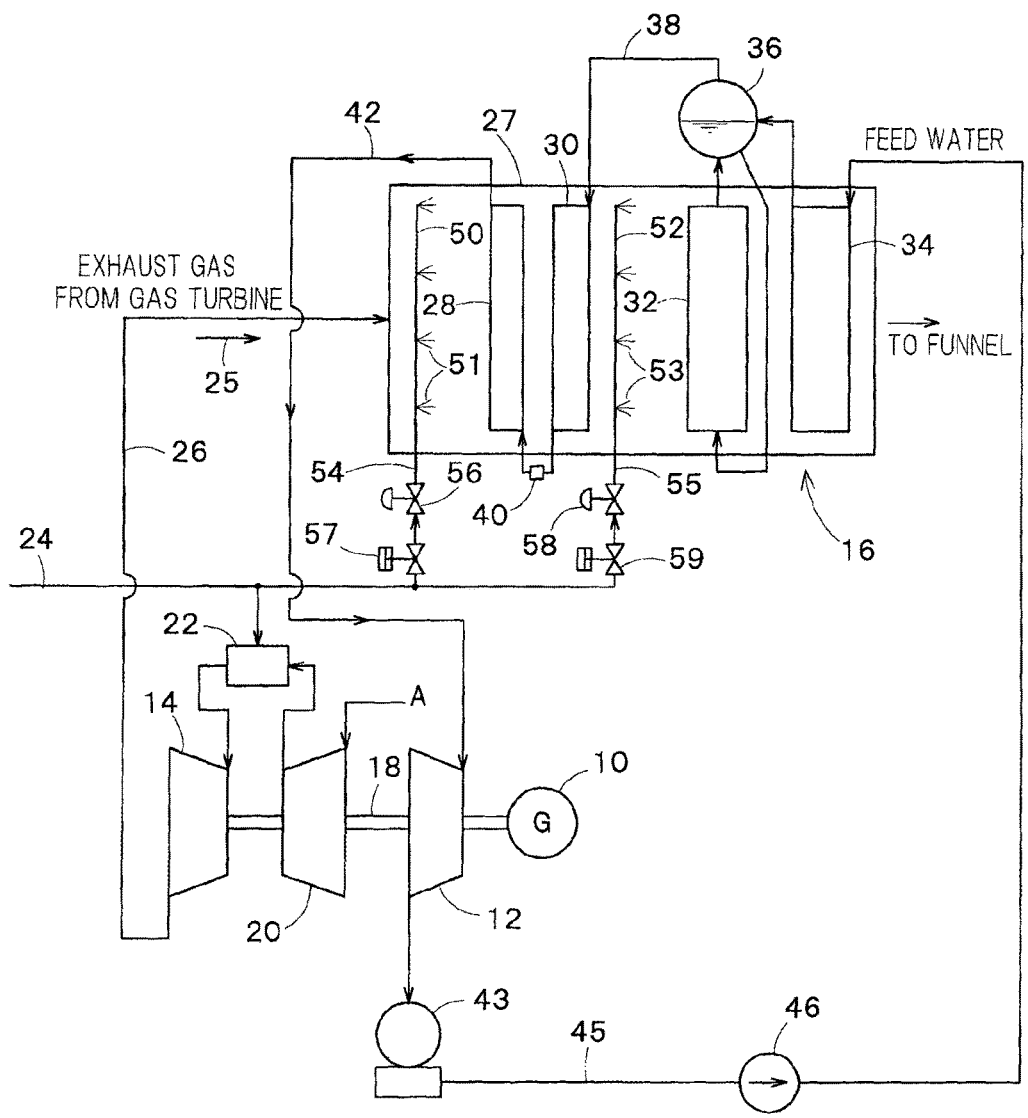
F I G. 1

HEAT RECOVERY STEAM GENERATOR AND POWER PLANT

CROSS-REFERENCE TO RELATED APPLICATION

This application is a divisional application and claims the benefit of priority under 35 U.S.C. § 120 to U.S. application Ser. No. 14/007,141, filed Feb. 6, 2014, which is a U.S. national stage application of PCT/JP2012/057784, filed Mar. 26, 2012, and claims the benefit of priority from Japanese Patent Application No. 2011-67530 filed on Mar. 25, 2011, the entire contents of each of which are incorporated herein by reference.

TECHNICAL FIELD

An embodiment of the present invention relates to a heat recovery steam generator and a power plant.

BACKGROUND ART

In recent year, combined-cycle power generation currently becomes the major steam in thermal power plants, in order to improve thermal efficiency of the plants. A combined-cycle power plant is a power plant in which a heat recovery steam generator is combined with a gas turbine and a steam turbine. A combustor provides the gas turbine with combustion gas of high temperature and high pressure. The gas turbine is revolved by expansion of the combustion gas so that a generator is rotated. Thereafter, exhaust gas is introduced into the heat recovery steam generator. In the heat recovery steam generator, steam is generated by utilizing thermal energy of exhaust gas. Steam is supplied to the turbine, and the generator is rotated by the steam turbine in collaboration with the gas turbine.

In general, a conventional heat recovery steam generator is a boiler which generates steam corresponding to heat of exhaust gas discharged from the gas turbine in order to supply steam to the steam turbine. A heat recovery steam generator provided with an auxiliary burner, which is capable of heating up exhaust gas, has been prevails in recent year. This is because decrease in the output of the gas turbine in the summer season results in reduction in an exhaust gas amount, so that it is necessary to compensate decrease in amount of steam generated by the heat recovery steam generator, and because steam should be also supplied to a cogeneration plant, a distilling plant and so on, in addition to the steam turbine.

In a newly developed heat recovery steam generator, an auxiliary burner shows a tendency to have a large size, with a view to increasing a steam supply amount. As a result of it, as exhaust gas temperature in the heat recovery steam generator rises, auxiliary burners are installed on a plurality of locations for the purpose of preventing the generator constituent parts from deteriorating the durability and reliability (see JP2001-116208A, for example).

DISCLOSURE OF THE INVENTION

In the heat recovery steam generator including the auxiliary burner, a thermal balance inside the heat recovery steam generator shows a large difference between when the auxiliary burner is fired to heat exhaust gas and when the auxiliary burner is ceased. In particular, in the heat recovery steam generator where auxiliary burners are installed on a plurality of locations, the excessive increase of evaporation amount may results in lowering the degree of superheating of steam or raising the degree of superheating of steam excessively.

Accordingly, in the heat recovery steam generator including a plurality of auxiliary burners, it is necessary to distribute fuel to each auxiliary burner properly. However, when fuel to be charged to one auxiliary burner is increased so as to increase the steam amount, steam temperature at a generator outlet may drop because of the increase in the steam amount. In order to cope with this, when fuel to the other auxiliary burner is increased in order to raise the steam temperature, this results in excessive superheating. There is a problem that controlling process of fuel amount becomes complicated in order to distribute fuel to each of auxiliary burner properly.

Therefore, the object of the present invention is to provide a heat recovery steam generator that can solve the above problem of the prior art, and can adequately distribute fuel to auxiliary burners located on a plurality of positions in the heat recovery steam generator, depending on an operation condition of the heat recovery steam generator.

Another object of the present invention is to provide a power plant including a heat recovery steam generator that can adequately distribute fuel to auxiliary burners located on a plurality of positions in the heat recovery steam generator, depending on an operation condition of the heat recovery steam generator.

In order to achieve the aforementioned object, a heat recovery steam generator according to an embodiment of the present invention is a heat recovery steam generator in which a plurality of heat exchangers consisting of a superheater, an evaporator and an economizer are installed in a duct along a flow direction of exhaust gas from a gas turbine, so as to generate steam by utilizing the exhaust gas of the gas turbine, the heat recovery steam generator comprising:

a first stage auxiliary burner configured to heat up the exhaust gas in the upstream side of the superheater;

a second stage auxiliary burner configured to heat up the exhaust gas in the upstream side of the evaporator;

a fuel supply system configured to distribute fuel so as to be supplied to the first stage auxiliary burner and the second stage auxiliary burner; and a fuel distribution control means configured to control distribution of fuel charged to each of the first stage auxiliary burner and the second stage auxiliary burner, in accordance with a predetermined distribution ratio of each charging quantity to whole charging quantity in all the range thereof.

In addition, a power plant according to the present invention is a power plant comprising a gas turbine configured to drive a turbine in rotation by combustion gas of high temperature and high pressure;

a heat recovery steam generator in which a plurality of heat exchangers consisting of a superheater, an evaporator and an economizer are installed in a duct along a flow direction of an exhaust gas from the gas turbine, so as to generate steam by utilizing the exhaust gas of the gas turbine;

a steam turbine configured to be driven by the steam generated by the heat recovery steam generator; and a generator configured to be driven by the gas turbine and the steam turbine;

wherein the heat recovery steam generator includes:

a first stage auxiliary burner configured to heat up the exhaust gas in the upstream side of the superheater;

a second stage auxiliary burner configured to heat up the exhaust gas in the upstream side of the evaporator;

a fuel supply system configured to distribute fuel so as to be supplied to the first stage auxiliary burner and the second stage auxiliary burner; and a fuel distribution control means configured to control distribution of fuel charged to each of the first stage auxiliary burner and the second stage auxiliary burner, in accordance with a predetermined distribution ratio of each charging quantity to whole charging quantity in all the range thereof.

BRIEF DESCRIPTION OF THE DRAWINGS

FIG. 1 is a schematic view of a power plant including a heat recovery steam generator in an embodiment according to the present invention.

BEST MODE FOR CARRYING OUT THE INVENTION

Figure 2:
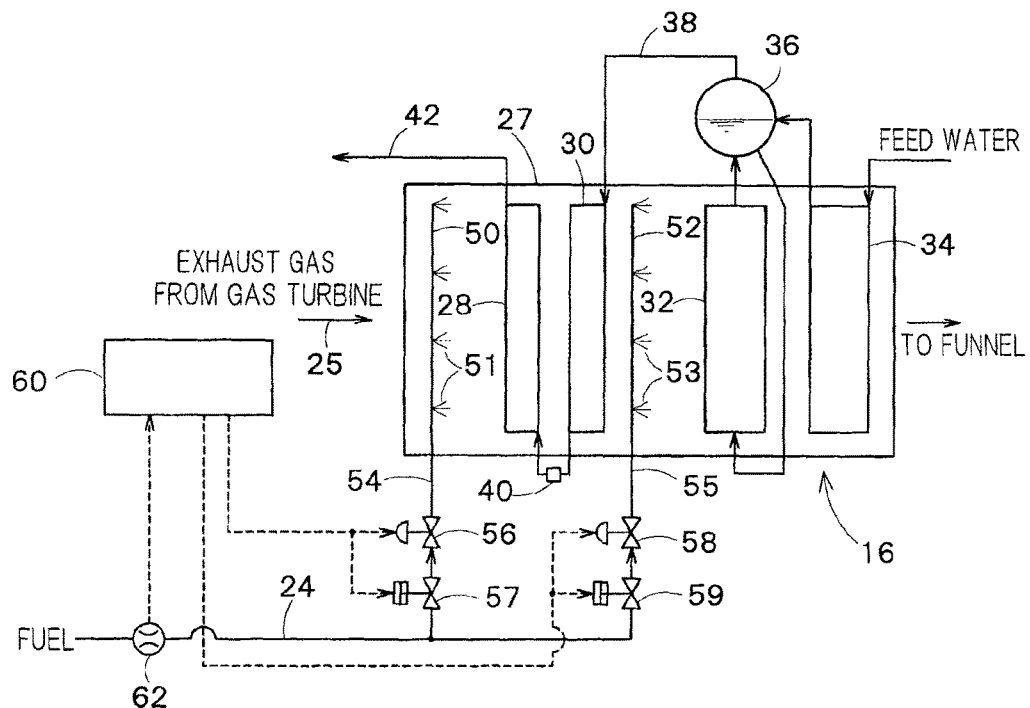
FIG. 2 is a schematic view showing the heat recovery steam generator in the embodiment according to the present invention.

An embodiment of a heat recovery steam generator and a power plant according to the present invention will be described herebelow with reference to the accompanying drawings.

FIG. 1 is a schematic view of the power plant of a combined-cycle type to which the heat recovery steam generator in this embodiment is applied.

In FIG. 1, the reference numeral 10 denotes a generator, the reference numeral 12 denotes a steam turbine and 14 denotes a gas turbine. The reference numeral 16 denotes the heat recovery steam generator.

The generator 10 is connected to the steam turbine 12 by a drive shaft 18 in common to the gas turbine 14. An air compressor 20 is coupled to the drive shaft 18. The air compressor 20 compresses air A sucked from the outside, and supplies a combustor 22 with the air A of high temperature and high pressure. In the combustor 22, the compressed air is mixed with fuel which is supplied from a fuel line 24 to burn up, so that combustion gas of high temperature and high pressure is supplied to the gas turbine 14. Due to the expansion of combustion gas, a turbine in the gas turbine 14 is driven in rotation, whereby the generator 10 is operated. Exhaust gas 25, discharged from the gas turbine 14, is led to the heat recovery steam generator 16 through an exhaust duct 26.

As shown in FIG. 1, inside a duct 27 in the heat recovery steam generator 16, four types of heat exchangers, i.e., a high-temperature superheater 28, a low-temperature superheater 30, an evaporator 32 and an economizer 34 are installed from upstream to downstream in order along the flow direction of the exhaust gas 25 discharged from the gas turbine 14. The evaporator 32 is provided with a steam drum 36. The economizer 34 heats up a boiler feed water by exhaust gas 25 and then supplies water to the steam drum 36. The steam drum 36 separates water from the saturated steam generated in the evaporator 32. Inside of the steam drum 36, a water level is maintained at a predetermined level, such that water and the saturated steam are well balanced. The evaporator 32 is recharged with water which is separated from the saturated steam in the steam drum 36.

The saturated steam inside the steam drum 36 is transferred to the low-temperature superheater 30 through a saturated steam pipe 38. The saturated steam is superheated in the low-temperature superheater 30 and is then transferred to the high-temperature superheater 28. Steam is further superheated in the high-temperature superheater 28. A desuperheater 40 for regulating steam temperature is installed between the low-temperature superheater 30 and the high-temperature superheater 28.

An outlet pipe 42 is connected to a outlet of the high-temperature superheater 28. The steam superheated by the high-temperature superheater 28 is transferred to the steam turbine 12 through the outlet pipe 42. The steam turbine 12 is rotated by the expansion of the superheated steam. The expanded steam is transferred to a condenser 43 to turn into water. Then, the water, passing through a condensate return pipe 45 by a condensate pump (not shown), is pressurized by a feed water pump 46. Thereafter, water is returned to the economizer 34. Fuel supply pipes 54 and 55, which respectively supply fuel to auxiliary burners 50 and 52, branch from the fuel line 24.

In the heat recovery steam generator 16 in this embodiment, the auxiliary burners 50 and 52 are installed on the locations, as described below.

The first stage auxiliary burner 50 is located on the most upstream position in the flow direction of the exhaust gas 25. In the case of the heat recovery steam generator 16 in this embodiment, the first stage auxiliary burner 50 is installed on the upstream side relative to the high-temperature superheater 28. In the first stage auxiliary burner 50, there are disposed a plurality of burners 51 so as to face toward the high-temperature superheater 28 on the downstream position. The first fuel supply pipe 54 is provided with a fuel regulating valve 56 and a fuel shut off valve 57. Thus, the fuel regulating valve 56 controls the quantity of fuel to be burned in the burners 51 by regulating a valve opening of the fuel regulating valve 56. To cease the operation of the burners 51, the fuel shut off valve 57 is closed.

The second stage auxiliary burner 52 is located on the downstream side of the first stage auxiliary burner 50. In the case of this embodiment, the second stage auxiliary burner 52 is located on the upstream side of the evaporator 32. In the second stage auxiliary burner 52, there are disposed a plurality of burners 53 so as to face toward the evaporator 32 which is located on the position downstream thereof. The second fuel supply pipe 55 is provided with a fuel regulating valve 58 that regulates the quantity of fuel, and a fuel shut off valve 59 that is closed when the operation of the burners 53 are suspended.

Figure 3:
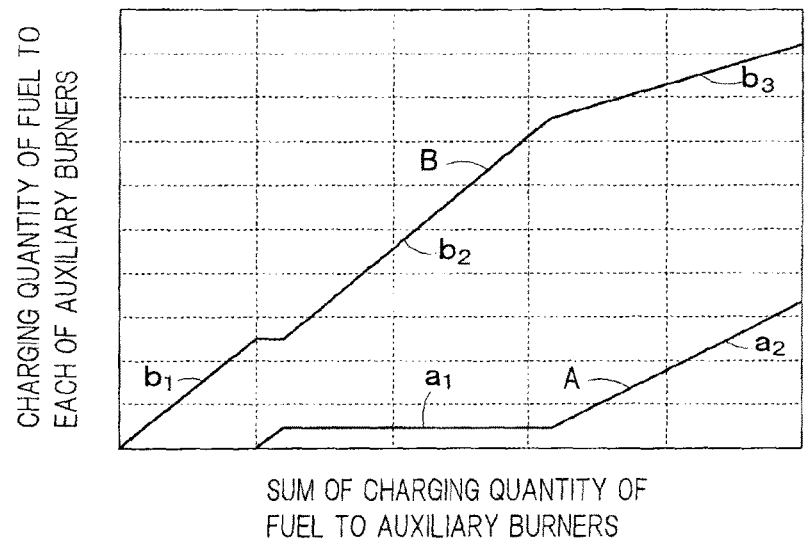
FIG. 3 is a graph showing variation in fuel distribution to auxiliary burners in the heat recovery steam generator in the embodiment according to the present invention.

In FIG. 2, the reference numeral 60 denotes a control unit that controls the operation of ignition and extinction of the first and second auxiliary burners 50, 52 and a flow rate of fuel to be charged to the first and second auxiliary burners 50, 52. The flow rate of fuel flowing through the fuel line 24 is detected by a flowmeter 62 and is inputted to the control unit 60. As shown in FIG. 3, a distribution ratio of the charging quantity of fuel to the first stage auxiliary burner 50 and second stage auxiliary burner 52 is predetermined. Based on the fuel distribution ratio relationship, the control unit 60 is configured to regulate the opening of the fuel regulating valves 56 and 58 respectively, so as to control the fuel flow rate to the first stage auxiliary burner 50 and the second stage auxiliary burner 52.

The heat recovery steam generator in this embodiment is as structured above. Next, the operation and the effect thereof will be described hereafter.

At first, the operation of the first stage auxiliary burner 50 and the operation of the second stage auxiliary burner 52 are described.

The second stage auxiliary burner 52 is installed on the upstream side of the evaporator 32. Thus, when the exhaust gas 25 is heated by flames spurted from the burners 53, as a whole, evaporation amount in the evaporator 32 can be increased.

In contrast, the first stage auxiliary burner 50 is installed on the upstream side of the high-temperature superheater 28 and the low-temperature superheater 30. Thus, when the exhaust gas 25 is heated by flames spurted from the burners 51, a degree of superheating of steam generated in the high-temperature super heater 28 and the low-temperature superheater 30 can be increased.

Process of controlling the fuel distribution to the first stage auxiliary burner 50 and the second stage auxiliary burner 52 will be described with reference to FIG. 3.

In FIG. 3, the abscissa of the graph shows the sum total of charging quantity of fuel to the first stage auxiliary burner 50 and the second stage auxiliary burner 52, and the ordinate of the graph shows the charging quantity of fuel to each of auxiliary burner 50 and 52. The polygonal line A shows a variation in the charging quantity of fuel to the first stage auxiliary burner 50, and the polygonal line B shows a variation in the charging quantity of fuel to the second stage auxiliary burner 52. Since the abscissa is the sum total of charging quantity of fuel, the sum of gradient values of the line A and the line B equals to 1.

In proportion to increase in the charging quantity of fuel, fuel is distributed between the first stage auxiliary burner 50 and the second stage auxiliary burner 52, in the manner as described below.

In FIG. 3, in this embodiment, the distribution pattern is divided into three regions, i.e., a small charging quantity region, a intermediate charging quantity region and a large charging quantity region, where fuel charging quantity differ from one another in distribution pattern.

Firstly, while the heat recovery steam generator 16 is operated without setting fire to the auxiliary burners 50 and 52, it happens that the quantity of steam in the steam turbine 12 comes short. In this case, in order to increase the quantity of steam to be supplied to the steam turbine 12, the burners 53 in the second stage auxiliary burner 52 are set fire and the charging quantity of fuel thereto is increased (line segment b1). In a case where both of the second stage auxiliary burner 52 and the first stage auxiliary burner 50 are fired from the beginning and the charging quantity of fuel thereto are simultaneously increased, or the first stage auxiliary burner 50 is fired prior to the ignition of the second stage auxiliary burner 52 and the charging quantity of fuel thereto is increased, the high-temperature superheater 28 and the low-temperature superheater 30 may be excessively superheated by exhaust gas of high temperature, in spite of a insufficient quantity of steam. The temperature of steam at the generator outlet is controlled by the desuperheater 40 provided between the high-temperature superheater 28 and the low-temperature superheater 30. When steam is excessively superheated, a spray flow rate in the desuperheater 40 may become superfluous and/or water induction to the low-temperature superheater 30 and the high-temperature superheater 28 may have some trouble. Taking these drawbacks into consideration, setting fire on the second stage auxiliary burner 52 and the feeding of fuel thereto are started precedently, and the first stage auxiliary burner 50 is suspended in the small charging quantity region.

As shown by the line segment b1 in FIG. 3, in the small charging quantity region, the control unit 60 linearly increases the charging quantity of fuel to the second stage auxiliary burner 52 at a constant rate, upon a request of increase in steam flow rate. Since the firepower of the burners 53 increases in accordance with increasing in the charging quantity of fuel, quantity of steam in the evaporator 32 increases by means of the exhaust gas 25 heated by the burners 53. Steam from the evaporator 32 is fed to the low-temperature superheater 30, the high-temperature superheater 28 in order. In the superheaters 30 and 28, steam is superheated by the exhaust gas 25 discharged from the gas turbine 14. Then, the superheated seam is supplied to the steam turbine 12.

At this moment, since the first stage auxiliary burner 50 is suspended, there is no possibility that steam is excessively superheated in the high-temperature superheater 28 and the low-temperature superheater 30. And superfluous spraying in the desuperheater 40 that controls steam temperature can be prevented. Thus, the steam temperature can be appropriately controlled. In the heat recovery steam generator 16 in this operating stage, increase in the amount of steam to be supplied to the steam turbine 12 is not so large. While the first stage auxiliary burner 50 is suspended, the second stage auxiliary burner 52 can afford the amount of steam required by the steam turbine 12.

As shown in FIG. 3, when the charging quantity of fuel to the second stage auxiliary burner 52 has reached a predetermined quantity, a fuel distribution control in the intermediate charging quantity region starts succeedingly.

In the intermediate charging quantity region, the first stage auxiliary burner 50 is set fire, in addition to the second stage auxiliary burner 52. After the burners 51 have been fired, the charging quantity reaches a quantity necessary for producing pilot flames. After that, the charging quantity of fuel is maintained constant (line segment a1). Simultaneously, while the charging quantity of fuel to the first stage auxiliary burner 50 increases, the second stage auxiliary burner 52 is charged with fuel at a constant flow rate.

For the purpose of increasing the amount of steam to be supplied to the steam turbine 12, the control unit 60 linearly increases the charging quantity of fuel to the second stage auxiliary burner 52 at a constant rate (line segment b2). Meanwhile, in the first stage auxiliary burner 50, the burners 51 are continuously burning in the manner to produce pilot flames.

In the heat recovery steam generator 16 in this operating stage, the amount of steam evaporated in the evaporator 32 increases. However, without reheating by the first stage auxiliary burner 50, the high-temperature superheater 28 and the low-temperature superheater 30 can sufficiently superheat steam by the exhaust gas 25. Depending on an operating condition of the power plant, there is a possibility that the steam temperature at the generator outlet goes down. If it is necessary to raise the degree of superheating of steam, by means of the pilot flames of the burners 51 in the first stage auxiliary burner 50, it is possible to promptly cope with the situation where the degree of superheating of steam should be raised.

As shown in FIG. 3, when the charging quantity of fuel to the second stage auxiliary burner 52 has reached a predetermined quantity, control unit 60 succeedingly starts fuel distribution control in the large charging quantity region.

In the large charging quantity region, for the purpose of increasing the amount of steam to be supplied to the steam turbine 12, the control unit 60 increases the charging quantity at a constant rate, to both of the first stage auxiliary burner 50 and the second stage auxiliary burner 52.

As shown by the line segment b3 in FIG. 3, due to the increase in the charging quantity of fuel to the second stage auxiliary burner 52, the amount of steam generated in the evaporator 32 increases. In this case, unless the exhaust gas 25 is heated by the first stage auxiliary burner 50 in order to raise the temperature of the exhaust gas 25, steam is insufficiently superheated in the high-temperature superheater 28 and the low-temperature superheater 30, whereby the steam temperature at the generator outlet might decrease.

Accordingly, in the case where the steam temperature goes down, the charging quantity on fuel is increased at a constant rate as shown by the line segment a2 to build up the firepower of the burners 51 and raise the temperature of exhaust gas 25, while monitoring the steam temperature at the generator outlet. Succesively, the degree of superheating of steam in the high-temperature superheater 28 and the low-temperature superheater 30 can be raised.

According to the embodiment, in the sum amount of the charging quantity of fuel to the first stage auxiliary burner 50 and the second stage auxiliary burner 52, the increasing rate of charging quantity of fuel to the first stage auxiliary burner 50 is set larger than the increasing rate to the second stage auxiliary burner 52. Thus, there is no possibility that the rise in the degree of superheating of steam cannot catch up with the increase in the amount of steam generated, whereby the relationship between the amount of steam generated and the steam temperature at the generator outlet can be kept appropriately. In addition, in view of the power plant as a whole, even when the amount of steam generated decreases because of the decrease in output of the gas turbine 14, the sufficient amount of steam at adequate temperature can be smoothly supplied, while increasing the charging quantity of fuel to the first stage auxiliary burner 50 and the second stage auxiliary burner 52. Note that the increasing rates of the charging quantity of fuel (gradients of the line segment a2 and the line segment b3) to the first stage auxiliary burner 50 and the second stage auxiliary burner 52 are taken by way of example, and are not limited thereto.

In addition, as the charging quantity of fuel to the first stage auxiliary burner 50 and the second stage auxiliary burner 52 are not independently controlled, but the total amount of fuel is distributed in accordance with a certain ratio. Thus, when the charging quantity of fuel to the first stage auxiliary burner 50 is determined, the charging quantity of fuel to the second stage auxiliary burner 52 is simultaneously controlled in a correlative manner where the appropriate relationship between the amount of steam produced and the steam temperature. In this manner, the controlling system of fuel distribution to the first stage auxiliary burner 50 and the second stage auxiliary burner 52 can be achieved by such a simple system.

The heat recovery steam generator according to the present invention has been described above by referring to the suitable embodiment. However, the embodiment is nothing more than an example, and the scope of the present invention is not limited thereto. Not limited to a steam turbine, the heat recovery steam generator of the present invention can be applied to a plant that supplies steam to a distilling plant, for example.

The invention claimed is:

1. A method of generating steam, comprising:
providing a heat recovery steam generator, the heat recovery steam generator comprising:
   a duct, in which an exhaust gas from a gas turbine is configured to flow;
   a superheater, an evaporator and an economizer disposed in the duct along a flow direction of the exhaust gas;
   a first auxiliary burner disposed at an upstream side of the superheater; and
   a second auxiliary burner disposed at the upstream side of the evaporator and at a downstream side of the superheater,
introducing the exhaust gas discharged from the gas turbine in the duct of the heat recovery steam generator;
distributing fuel to at least one of the first auxiliary burner and the second auxiliary burner in accordance with a predetermined distribution ratio of quantities of the fuel to be distributed to at least one of the first auxiliary burner and the second auxiliary burner,
wherein, in the distributing,
the quantity of the fuel to the second auxiliary burner is increased with an increase in a steam amount generated in the heat recovery steam generator in a first charging quantity region, and
the quantity of the fuel to the first auxiliary burner is kept constant to maintain a pilot flame in a second charging quantity region where the steam amount is greater than that in the first charging quantity region and a degree of superheating of steam in the superheater is higher than a predetermined superheating degree.

2. A method of operating a power plant, comprising:
generating steam according to claim 1 by operating the gas turbine to discharge the exhaust gas; and
operating a steam turbine with the steam.

* * * * *